(12) United States Patent
Cornish et al.

(10) Patent No.: US 7,923,039 B2
(45) Date of Patent: *Apr. 12, 2011

(54) BIOPOLYMER EXTRACTION FROM PLANT MATERIALS

(75) Inventors: Katrina Cornish, Vista, CA (US); Raymond G. McCoy, III, Chandler, AZ (US); Jeffrey A. Martin, Carlsbad, CA (US); Jali Williams, Phoenix, AZ (US); Anthony Nocera, Jr., Mesa, AZ (US)

(73) Assignee: Yulex Corporation, Maricopa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/327,266

(22) Filed: Jan. 5, 2006

(65) Prior Publication Data
US 2006/0149015 A1    Jul. 6, 2006

Related U.S. Application Data

(60) Provisional application No. 60/641,578, filed on Jan. 5, 2005.

(51) Int. Cl.
*C08F 6/04* (2006.01)
*C08J 3/02* (2006.01)
*D21B 1/36* (2006.01)

(52) U.S. Cl. ............ 424/725; 209/3; 209/12.1; 209/13; 210/511; 210/634; 424/775; 526/238.3; 526/335; 528/1; 528/480; 528/499; 528/502 R; 528/502 A; 528/502 D; 528/930; 528/931; 528/932; 528/934; 528/937

(58) Field of Classification Search ............ 210/634, 210/511; 424/725, 775; 209/3, 12.1, 13; 528/1, 480, 499, 502 R, 502 A, 502 D, 930, 528/931, 932, 934, 937
See application file for complete search history.

(56) References Cited

U.S. PATENT DOCUMENTS

| | | | |
|---|---|---|---|
| 2,119,030 A * | 5/1938 | Spence ..................... 528/488 |
| 3,616,222 A | 10/1971 | Dasinger | |
| 3,806,619 A | 4/1974 | Zosel | |
| 3,812,012 A | 5/1974 | Buschmann et al. | |
| 3,972,775 A | 8/1976 | Wilke et al. | |
| 3,990,944 A | 11/1976 | Gauss et al. | |
| 3,990,945 A | 11/1976 | Huff et al. | |
| 4,009,075 A | 2/1977 | Hoge | |
| 4,089,745 A | 5/1978 | Antrim et al. | |
| 4,094,742 A | 6/1978 | Bellamy | |
| 4,097,333 A | 6/1978 | Freytag et al. | |
| 4,104,409 A | 8/1978 | Vitzthum et al. | |
| 4,681,929 A * | 7/1987 | Cole et al. .................... 528/493 |
| 4,684,715 A | 8/1987 | Kay et al. | |
| 4,804,741 A * | 2/1989 | Verbiscar et al. ............ 528/503 |
| 5,171,592 A * | 12/1992 | Holtzapple et al. ............. 426/69 |
| 5,580,942 A * | 12/1996 | Cornish ........................... 528/1 |
| 5,849,854 A * | 12/1998 | Noda ................................ 528/1 |
| 6,054,525 A | 4/2000 | Schloman, Jr. et al. | |
| 6,569,375 B1 | 5/2003 | McGlothlin et al. | |
| 6,623,600 B1 | 9/2003 | Henriksen | |

OTHER PUBLICATIONS

Fukushima, Y., "Application of Supercritical Fluids," magazine article, R&D Review of Toyota CRDL, vol. 35, No. 1, pp. 1-9, Nov. 8, 1999.
Vasukumar, K. et al., "Supercritical Fluid Rechnology in Pharmaceutical Research," CRIPS, vol. 4, No. 2, pp. 8-12, Apr.-Jun. 2003.
"Subcritical Water Processing," internet article, http://222.scrub.lanl. gov/2002/scf/capability/water.htm, pp. 1-3, Jan. 18, 2004.

* cited by examiner

*Primary Examiner* — Ana L Woodward
(74) *Attorney, Agent, or Firm* — The Law Office of Jane K. Babin, Professional Corporation; Jane K. Babin

(57) ABSTRACT

Disclosed is a method and apparatus for the extraction of high molecular weight biopolymers from plants. Specifically, invention described herein relates to the commercial processing of plant material, including that from desert plants native to the southwestern United States and Mexico, such as the guayule plant (*Parthenium argentatum*), for the extraction of biopolymers, including natural rubbers. More specifically, the invention relates to laboratory to commercial scale extraction of high molecular weight biopolymers from plant materials including the chemical and mechanical processing of the plants and purification of the extracted biopolymer.

42 Claims, 2 Drawing Sheets

BIOPOLYMER EXTRACTION FROM PLANT MATERIALS

CROSS REFERENCE TO RELATED APPLICATIONS

This Application claims the benefit of priority of U.S. Provisional Application Ser. No. 60/641,578, filed Jan. 5, 2005.

FIELD OF THE INVENTION

The invention described herein relates to the commercial processing of desert plants native to the southwestern United States and Mexico, including guayule plant (*Parthenium argentatum*), for the extraction of biopolymers, such as natural rubbers. More specifically, the invention relates to the method of commercial scale production of extracting a high molecular weight biopolymer from plant materials, including the cultivating, harvesting, defoliating and decorticating, and chemical and mechanical processing of the plants.

BACKGROUND OF THE INVENTION

Natural rubber, derived from the plant *Hevea brasiliensis*, is a core component of many consumer goods, including medical devices and products, such as latex gloves. The United States has a strong reliance on natural rubber, primarily because synthetic alternatives cannot match the high performance properties of natural rubber required for many applications and tend to be prohibitively expensive.

Over 90% of the *Hevea*-derived natural rubber imported by the United States originates in Indonesia, Malaysia and Thailand. Natural rubber sources in these countries are under intense threat from potential diseases and blights due to the genetic similarity of the rubber plants. Furthermore, the crop is limited by a restricted geographic area and labor-intensive harvesting methods. In addition, the Southeast Asian natural rubber crop contains many protein contaminants which are responsible for Type-I latex allergies, which are estimated to affect as many as 20 million Americans.

The high cost of importation to the United States, as well as the potential for the entire crop to be wiped out by disease and the ubiquity of latex allergies, make non-allergenic domestic natural rubber alternatives particularly attractive.

As an alternative to synthetic rubber sources, attention is being directed to the production of hydrocarbons in plants such as guayule (*Parthenium argentatum*). Guayule is a desert plant native to the southwestern United States and northern Mexico and which produces polymeric isoprene essentially identical to that made by *Hevea* rubber trees in Southeast Asia. Guayule plants store latex in tiny inclusions in the bark, making harvest of the outer fibrous layers of the plant, desirable. Guayule normally yields one half ton to one ton of rubber per acre in cultivation and is ready for harvest and processing after only two years.

Therefore, a need exists for a cost-effective, efficient, and environmentally friendly, high-yield method of extracting and fractionating biopolymers, such as rubber, from plant materials, such as guayule.

DETAILED DESCRIPTION OF THE VARIOUS EMBODIMENTS

The present invention utilizes a method of multiple steps in the processing of native desert plants for the extraction of biopolymers such as natural rubber, using chemical and mechanical processing. The method described herein utilizes the following general steps: pre-grinding, wet milling, filtration, clarification, separation of liquid phases, purification, creaming, and concentration (FIGS. 1A and 1B), although within each of these general steps there are more specific steps, and the process may be modified to add or omit steps as required.

In various embodiments, the method may be performed in a variety of scales, including laboratory scale or other small scale (less than 50 lbs of plants processed per hour), pilot plant scale (typically 50-500 lbs of plants processed per hour), and commercial scale (typically over 1,000+ lbs of plant processing capacity per hour). In one embodiment of the invention, the commercial scale variation of the process has a processing capacity of 15,000 lbs of plants per day and a liquid capacity of approximately 3,300 gallons per day, using a series of high capacity tanks. Accordingly, the method disclosed may be used for small areas of less than 50 acres of plant materials annually to an industrial scale of more than 5,000 acres annually.

Examples of plant materials that can be used include, but are not limited to, guayule plant (*Parthenium argentatum*), gopher plant (*Euphorbia lathyris*), mariola (*Parthenium incanum*), rabbitbrush (*Chrysothamnus nauseosus*), milkweeds (*Asclepias* sp.), goldenrods (*Solidago* sp.), pale Indian plantain (*Cacalia atripilcifolia*), rubber vine (*Crypstogeia grandiflora*), Russian dandelions (*Taraxacum* sp. and *Scorzonera* sp.), mountain mint (*Pycnanthemum incanum*), American germander (*Teucreum canadense*) and tall bellflower (*Campanula america*).

The process disclosed herein extracts and purifies biopolymers such as natural rubber from non-*Hevea* plants, and the extracted biopolymers may then be processed for a variety of commercial uses, for example in the case of natural rubber, products including latex-based goods, such as gloves and latex-based medical devices.

Figure 1A:
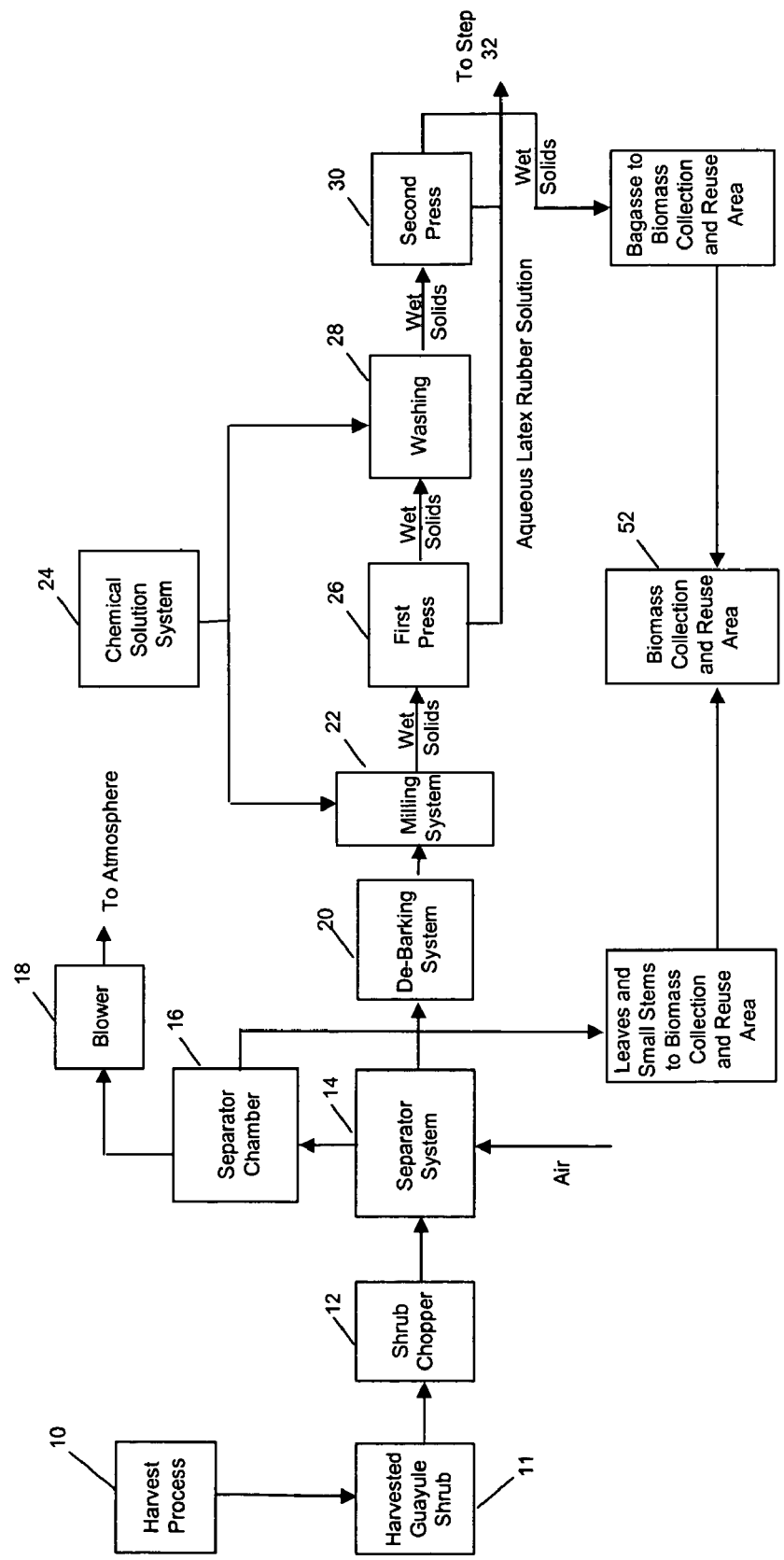
FIG. 1A is a flow chart of the initial steps of the processing system.

As shown in FIG. 1A, in a typical harvest process 10, plants are cultivated, harvested and baled using standard farming practices. For example, with guayule (*Parthenium argentatum*), plants are harvested every two years, or at the point where molecular weights of rubber are at sufficient levels to produce a sufficient quantity of rubber, i.e., yielding an amount that makes the harvest cost-effective and worthwhile, as well as the desired levels of rubber quality. Rubber production in plants such as guayule is highly dependent on environmental factors such as temperature and irrigation levels. As a result, these seasonal conditions are variable from year to year and directly influence the timing and frequency of the harvesting process 10.

Other types of plants will have different harvesting processes 10 and plant maturity and readiness for harvest is determined by an assay to quantify the concentration of latex prior to extraction according to the method disclosed herein. For example, in plants such as guayule, rubber particles are suspended in the cytoplasm, and water availability during growing directly affects the quantity of the final product in the latex extraction. Where the plant becomes dehydrated, the particles can coagulate in situ, irreversibly solidifying the rubber in the plant, even upon re-hydration of the plant. Accordingly, consistently irrigated plants contain higher levels of cytoplasm-based latex and will generally yield a better end product. For example, if the plant contains 12% weight (wt %) latex rubber concentration, high quality latex is extracted. A plant must contain at least 1% weight latex in order to be used in the present invention.

The harvest process 10 is generally timed based on desired plant height and weight on a scale, as well as moisture content based on drying analysis. Using guayule as an example, the harvest process 10 will typically not occur until plants are at least one year old and have reached optimal latex concentrations for commercial scale operations. After two years, plants are typically 1-2 feet tall and weigh approximately 6 lbs on a wet weight basis without the root. With intact root systems, guayule plants weigh approximately 7 lbs. There is no upper limit for harvest process 10 and subsequent extraction. Fully mature guayule plants (which may reach 6 feet in height and weigh more than 50 lbs) may also be processed according to the method disclosed herein.

Using guayule as an example species, in one embodiment of the harvest process 10 the plant is harvested by hedging or pollarding (cutting the trunk of the plant above the root base) the plant, so that only above-ground portions of the plant are harvested and subsequently processed. In another embodiment of the harvest process 10, the entire plant is dug from the ground and the shoots and roots are subsequently processed. In yet another embodiment of the harvest process 10, the plants are partially processed in the field into smaller parts to allow improved packing densities as the plant is baled or packed into carts, hoppers, containers or trucks for transportation to the processing plant. Depending on weather conditions, guayule plants may be harvested several times. For example, a crop may be irrigated for two years before the first winter harvest, then pollarded in the spring, and re-harvested the following spring. When guayule plants are pollarded during the harvest process 10, the plants will re-grow for another harvest in the future.

In various embodiments of the harvest process 10, leaves are removed from plants in the field, or removed at a processing facility. Plants may be defoliated using mechanized shearing, hand shearing, hedge shearing, or with non-dehydrating chemical defoliants. For example, defoliation may be performed using a gravity-based conveyor belt system, washing steps, and/or air or water pressure to remove leaves. An alternate embodiment of the harvest process 10 does not include defoliating the plants.

After the harvest process 10, the plants are sent to a chopper 12, capable of chopping the plant pieces into a relatively uniform size or shape. The chopper 12 chops the plants into uniform pieces to enable a separator system 14 to remove a major portion of the leaves, flowers, and small stems and then prepare the larger stems for de-barking and wet milling operations for latex rubber extraction. Plant piece chopping size is dependent on desired scale, technique, use, and preferred end product. For example, piece sizes may range from smaller than ½ inch to larger than about 8 inches, with an average size of 3-6 inches for maximized rubber extraction. If the plant is chopped too finely, latex losses will be greater due to oxidation and dehydration of a higher surface area of exposed chopped plant.

The chopper 12 may include any type of chopping equipment, including blenders, mills, anvil choppers, or other types of choppers. The chopper 12 capacity optionally reflects the desired manufacturing scale. For example, on a laboratory scale, a chopper 12 would process about ¼ lbs of plants per hour, while at the pilot plant scale 500-1,000 lbs per hour might be processed. At the commercial scale, the chopper 12 would be capable of processing 1,000 lbs or more of plants per hour.

Following the chopper 12 step, in one embodiment, the chopped plants are separated by the separator system 14, to separate leaves, flower parts and small stems from processing. Some or all leaves may be included in the processing; however, leaves, flower parts and small stems may produce undesired results, such as decreased latex stability, or discoloration. Therefore the separator system 14 is an optional step.

One example of the separator system 14 is an air density separator, which is further comprised of a separator chamber 16 and a blower 18, as shown in FIG. 1A. The separation step removes the majority of the leaves, flower parts and small stems of a mature harvested plant, which range typically between 30-35 weight percent ("wt %") concentration in water, and do not contain latex rubber. Leaf, flower and small stem wt % is dependent on harvest conditions, annual growth of the plant, type of plant and other factors, and therefore this range is only one acceptable range for removing leaves, flower parts and small stems. Range of wt % may be set depending on these other conditions, or the desired product.

As shown in FIG. 1A, in one embodiment of the invention, the separator system 14 is an air density separator capable of separating the small leaves and stems from the rest of the plant within the separator chamber 16 via forced air from the blower 18, which lifts the lighter leaves, flower parts, small stems, and dirt from the heavier bark and woody pulp of the chopped plant. The leaves, flower parts and small stems are air conveyed and collected for biomass reuse, to the biomass collection and reuse area 52.

In this embodiment, the blower 18 is located downstream of the separator chamber 16, such that the separator system 14 is operating at negative pressure and air enters through baffles in the bottom of the separator chamber 16 under vacuum pressure. In this embodiment, the blower 18 is further capable of forcing sufficient air capacity to lift leaves, flower parts, stems, and dirt and in one embodiment may be adjusted for air flow, depending on desired particle size. For example, within separator chamber 16, the light pieces (leaves, flower parts and small stems) may be separated by fluidization, internal baffles, and/or flow, where the leaves, flower parts and small stems are separated from the air and discharged at the bottom of the separator chamber 16, through a rotary airlock feeder.

One embodiment of an air density separator system 14 for large scale processing is a high capacity manufactured by Carver Inc.-Lummus Corp. (Savannah, Ga.), which discharges the chopped larger size woody pieces and bark out of the bottom of the separator system 14 as feedstock for further processing. For example, in one embodiment the blower 18 is set to a bulk pressure lift point somewhere between the weight of the bulk of the plant and bark pulp (pressure of 12-13 lbs/ft$^3$), and the weight of the leaves, flower parts and small steps (bulk pressure of 4-8 lbs/ft$^3$). The separation takes place based on the difference in density.

A greater difference between the two densities makes separation easier. Additional separation system 14 steps may be optionally used where the difference is smaller, for example, via modifications to the blower 18 set with corresponding air flow geometry and cross-sectional velocity, based on the weights of the materials, or the scale of the separator chamber 16, to allow the material to be separated by air fluidization.

In another embodiment, the separator system 14 comprises separation by mechanical or human separation. For example, the separator system 14 may comprise hand shearing or hedging the leaves and small stems in the field.

Leaves, flower parts and stems separated from the rest of the guayule plant using the separator system 14, may be sent to a biomass collection and reuse area 52 (as shown in FIG. 1A). For example, the collected leaves and stems may be processed by a bio-refinery into a variety of ligins or resins, and used in a variety of products, such as bio-adhesives, coatings, bio-pesticides, antifungal agents, and anti-termitic agents. Leaves, flower parts and stems may also be processed into cellulose or hemi-cellulose and used for a variety of bio-fuels, such as ethanol, and other bio-products, such as insulation. Any leaves, flower parts and stems may also be spread back on agricultural fields as mulch, or combined with other by-products of the process.

Any larger pieces for further processing (e.g., bark, chopped plant, and pulp) are discharged from the separator system 14 and conveyed to the next processing step. Conveyance methods include convectional conveying equipment including but not limited to augers, belt conveyors, hand, bucket elevators, or other similar solids handling equipment.

The latex rubber is located in the bark of the chopped guayule sticks and root components. In order to increase separation efficiency and reduce the amount of solid material processed in the latex extraction, as shown in FIG. 1A, the method may optionally include a de-barking (or decorticating) system 20 following the separator system 14. De-barking increases the efficiency of the process overall. For example, if the de-barking system 20 is used, a greater percentage of latex is extracted in initial concentration and separation steps, decreasing the need for extensive processing in later stages of the invention.

In one embodiment, the de-barking system 20 may comprise high pressure washing or air jets to strip the bark off the plant. The de-barking system 20 may also comprise a mechanical method to strip the bark from the plant. The de-barking system 20 may also comprise manual de-barking, using hand stripping of the bark from the plant. In this embodiment, the bark is then carried to the processing facility by conveyor, and any leftover plant material is transported away for further refining or disposal. In further embodiments of the de-barking system 20, root systems or root balls of the plants, or entire plants, may be used. In one embodiment, the de-barking system 20 may also be performed simultaneously with the separator system 14 step. In other embodiments the de-barking system 20 may be omitted.

As with leaves and stems, non-rubber containing woody pulp derived from the de-barking system 20 may be collected and sent to the biomass collection and reuse area 52 for use in secondary manufacturing processes. For example, the collected woody pulp may be processed by a bio-refinery into a variety of ligins or resins, and used in a variety of products, such as bio-adhesives, coatings, bio-pesticides, antifungal agents, and anti-termitic agents. Woody pulp may also be processed into cellulose or hemi-cellulose and used for a variety of bio-fuels, such as ethanol, and other bio-products, such as insulation. Woody pulp may also be spread back on agricultural fields as mulch or spread and ploughed in as an organic soil amendment.

Following either the de-barking system 20 or separator system 14, plants are further processed in a chemical solution system 24. The chemical solution system 24 comprises the addition of a water-based solution to emulsify the plant material to form a slurry during a milling system 22 step, followed by a first press 26 step, and a washing step 28. As shown in FIG. 1A, after the washing step 28, the chemical solution system 24 may further comprise passing the emulsified plant material through a second press 30 step, or further additional press steps (not shown). The chemical solution system 24 as disclosed will result in a solid product containing a biomass by-product called "bagasse" and liquid homogenate slurry containing water-based solution and dilute latex from milled plant material. In addition to water, the chemical solution system 24 contains a buffer, such as ammonium hydroxide ($NH_4OH$), potassium hydroxide (KOH), sodium hydroxide (NaOH) or sodium bicarbonate ($NaHCO_3$). Other buffers may also be used, for example, Tris and Trizma.

The chemical solution system 24 also optionally contains anti-microbial agents, de-foaming or anti-foaming agents, bleaching agents, and/or stabilizers depending on desired product quality, stability, color, or purity or sterility requirements. Further, anti-oxidants, such as sodium sulfite ($Na_2SO_3$), butylated hydroxytoluene (BHT), butylated hydroxyanisole (BHA), ascorbate, propyl gallate, alkylated diphenylamine, polybutylated bisphenol A, alkylated para-phenylenediamine, styrenated phenol, or hindered bisphenol may be used. These anti-microbial agents, de-foaming agents, bleaching agents, stabilizers, and/or anti-oxidants may be added at various steps in the method disclosed herein, also depending on desired product quality, stability, color, purity, or sterility requirements.

The chemical solution system 24 is maintained at a sufficiently basic pH (e.g., greater than approximately pH 7.1) but not so basic so as to become caustic (e.g., less than approximately pH 12.5). Any chemical solution system 24 with a pH of about 10.0-12.0 may be used for optimized stability and increased anti-microbial effect. Example 1 illustrates one type of chemical solution system 24.

The milling system 22 comprises grinding plant material to relatively uniform pieces in a chemical solution system 24, as disclosed above. In one embodiment, the milling system 22 grinds chopped homogenous plant pieces into emulsified slurry with a controlled amount of chemical solution at different places at the milling to extract the latex, which is contained in the bark parenchyma cells of the plants. In this embodiment, the milling system 22 forcibly fractionates whole or partial plant materials into smaller pieces, breaks the cells of the plant, and allows the latex rubber to transfer to the aqueous liquid for recovery and purification. The milling system 22 includes wet mills, as shown in Example 2, as well as dry mills, shredders, ball grinders, and hammer mills.

As shown in FIG. 1A, the milling system 22 step is then followed by the first press 26 step and the washing step 28 and the second press step 30, one example of which is disclosed in Example 2. For example, technology used in the milling system 22 step, the first press 26 step, the washing step 28, and the second press 30 step, may include commercially available machines, such as those manufactured by Brown International (Covina, Calif.), Amatech Polycel, Inc. (Columbus, Ohio), Komline-Sanderson Filters (Ogdensburg, N.J.), Andritz Bird (Austria), and USFilter/Stranco (Bradley, Ill.). Additionally, technology used in the milling system 22 step, the first press 26 step, the washing step 28 and the second press 30 step, may further be monitored using a full material balance to determine the amount, percentage, and/or quality of latex going in and out of each step.

As shown in FIG. 1A, the next component of the chemical solution system 24 is the first press 26 step. The first press 26 step removes a major portion of the latex rubber from the bagasse. Following the milling system 22, the resulting latex rubber is suspended in an aqueous solution as an emulsion and is removed from the biomass emulsion slurry by squeezing the liquids from the slurry in the first press 26. The first press 26 may comprise a screw auger, a screw press, belt press, filter press, vacuum filter, bladder press, or other type of press used to squeeze liquids from plants or chemical solids.

The first press 26 separates liquid and solid phases by pressing the liquid slurry through a screen. The liquid phase, or latex homogenate liquid slurry, passes through the screen, while the solid phase, called the bagasse, does not pass through the screen. The first press 26 is optimized to tightly squeeze the maximum amount of liquid from the bagasse. In one embodiment, the liquid latex homogenate slurry is collected in a recirculation tank (not shown), collection tank (not shown), or a decanter 32, and the bagasse is moved to a separate collection area, for example, by dropping directly into a paddle washer. Latex extraction is measured by assay, for example using a wet grind in a closed system such as a Waring Products (Torrington, Conn.) laboratory blender. Depending on the amount of latex extracted during the first press 26 step, and the desired latex yield, the washing step, 28 and the second press 30 step may be omitted.

As shown in FIG. 1A, following the first press 26 step, in order to optimize extraction of latex from the bagasse, a washing step 28 may optionally be used in order to remove additional latex particles trapped in the bagasse after the first press 26 step. In at least one embodiment, the washing step 28 utilizes a water tank with a booster pump capable of pressurizing feeds into machinery, allowing water to interface with any resulting liquid phase latex homogenate slurry that is washed from the bagasse. For example, in this embodiment, the liquid phase latex homogenate slurry is pumped to the paddle mixer through the use of solenoids. Generally, the extraction method disclosed herein preferably contains the lowest possible number of washing steps 28 (typically less than two washing steps 28) in order to minimize water use through the system.

As shown in FIG. 1A, in some embodiments, where the optional washing step 28 is included, and the bagasse is passed through the second press 30 step, for further processing, the second press 30 step may utilize a smaller screen or filter size, in comparison with the first press 26 step, depending on desired results. The second press 30 step is used to extract a greater latex yield from the bagasse. The liquid containing the latex rubber is collected separately in a collection tank or sent to the decanter 32.

During the second press 30 step, any remaining latex homogenate slurry is pressed out of the bagasse by the second press 30 and any resulting liquid is again separated from any remaining solids. The liquid phase is pumped into a collection tank or the decanter 32, while the solid phase bagasse drops into another collection area. The second press 30 step may optionally be followed by a washing step and repeated with additional press steps (not shown). Quantification assays are performed following each press step and again after the final press step (e.g., the second press 30 step).

After the final press step (e.g., the second press 30 step) the bagasse is collected, and moved to a biomass collection and reuse area 52 for use as in secondary manufacturing processes including for resin extraction, fuel, particle board, and ethanol. For example, the bagasse may be processed by a biorefinery into a variety of ligins or resins and used in a variety of products, such as bio-adhesives, coatings, bio-pesticides, antifungal agents, and anti-termitic agents. Bagasse may also be processed into cellulose or hemi-cellulose and used for a variety of bio-fuels, such as ethanol, and other bio-products, such as insulation. Other products produced in this secondary manufacturing step may include fuel pellets, fireplace logs, ceiling tiles, building materials, playground equipment, and flooring. Any bagasse, either intact or deresinated, may also be spread back on agricultural fields as mulch or sold commercially as mulch.

Figure 1B:
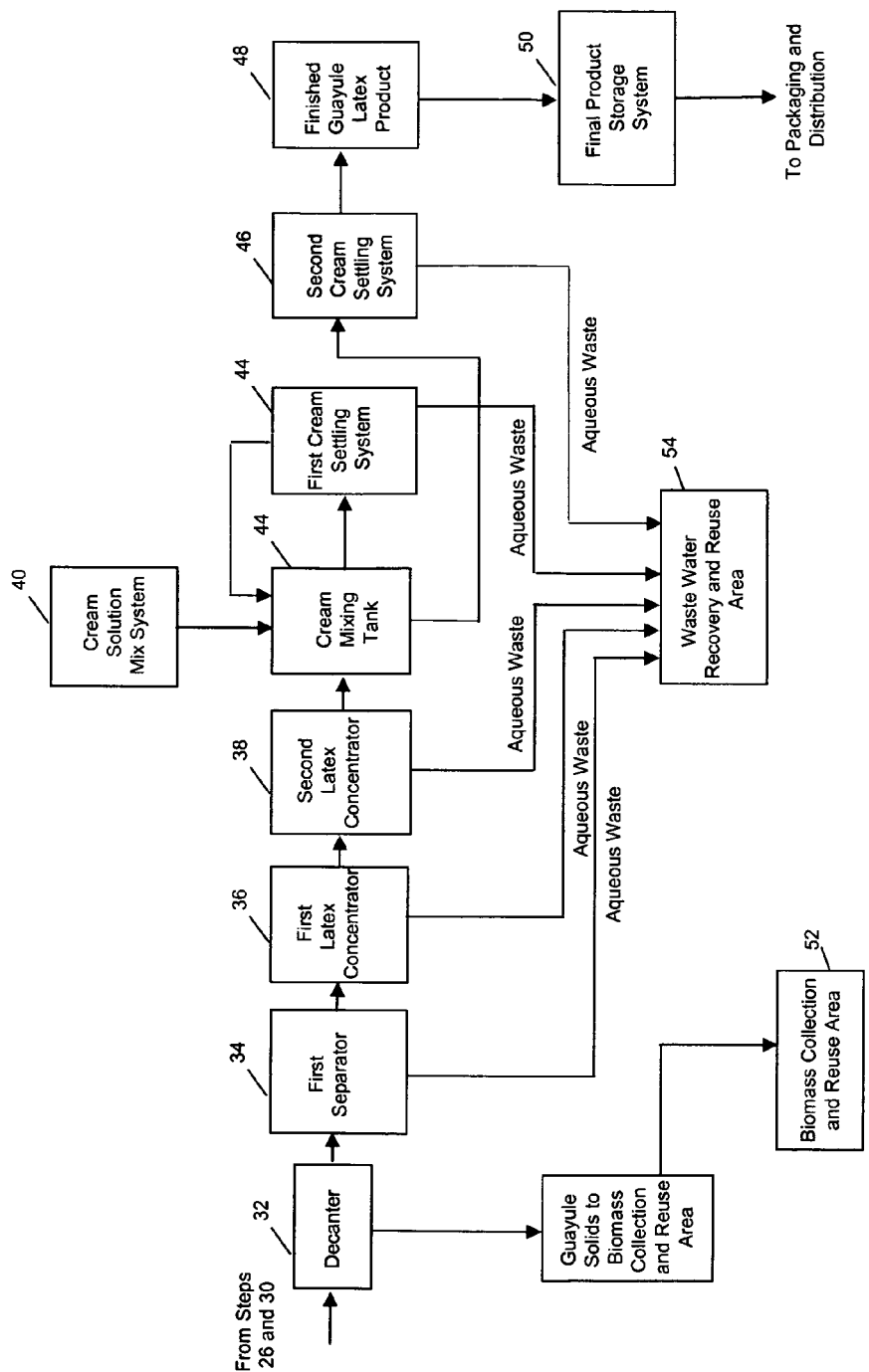
FIG. 1B is a flow chart of the final steps of the processing system.

As shown in FIG. 1B, after the final press step (e.g., the second press 30 step) and removal of the bagasse to the biomass collection and reuse area 52, the resulting liquid latex homogenate is then optionally transferred into a collection tank (not shown) or the decanter 32.

Though optional, the decanter 32 step removes the maximum amount of undesirable solids in the latex, while retaining the maximum amount of latex. Decreasing the amount of undesirable solids increases efficiency by reducing clogging in later steps, (e.g., the first press 28 step and/or the second press 30 step). For example, without the decanter 32 step, solids not removed from the latex may eventually shorten operating cycles and may cause undesirable down time and latex loss. Undesirable solids may also affect latex storage and stability.

The transfer to the decanter 32 can be either directly from the last screw press step (e.g., the second press 30 step), from a recirculation or storage tank, directly from the first press 26, or from a combination of these sources (e.g., a combination of homogenate from the first press 26 and second press 30) which are mixed together before decanting.

In an alternate embodiment, the homogenate from the first press 26 step is processed further whereas the homogenate from the second press 30 step is re-circulated back into the milling system 22 step as an aqueous grinding medium, whereupon any resulting latex-containing homogenate is cycled through to the decanter 32. The decanter 32 may comprise a centrifuge, tank, or other separator.

The decanter 32 may include any physical or mechanical phase separating systems used to separate the liquid phase containing latex from a solid phase containing waste products consisting of fine non-rubber particulates that were not removed in previous steps. Examples of the decanter 32 include centrifuge decanters manufactured by Westphalia (Germany), Alfa Laval (Sweden) and Sharples (UK). For example, in one embodiment, a centrifuge-based decanter 32 process can remove about 80-85% of the undesirable solids without removing any latex, in about 30 seconds of centrifugation. Centrifuge decanters 32 provide the benefits of continuous operation and fast removal of solids, but these are not the only type of decanter 32 capable of performing this step. In other embodiments, other types of decanter 32 equipment may be used for decanting, such as other filtration systems (e.g., one filter or a series of filters, driven by a belt system) or other processes.

During decanting, latex-containing homogenate liquid (collected from any of the previously disclosed steps 22-30) is run through the decanter 32, to remove coarse plant solids from the latex emulsion liquids. The decanter 32 separates solid materials from liquid phases (e.g., via centrifugation). In various embodiments, optional additives, such as stabilizers, anti-foaming agents, or de-foaming agents, may be added to the clarified liquid latex homogenate during or after the decanter 32 step, in order to enhance specific chemical or physical properties of the latex particles during subsequent processing using centrifugation. In alternate embodiments of the invention, stabilizing compounds are not added.

Bagasse solids from the decanter 32 may be collected for use as a feedstock for secondary manufacturing processes including resin extraction, fuel, particle board, and ethanol. The bagasse solids that are collected at the solids collection and reuse area 52 may be combined with the bagasse, bark, leaves or stems collected in previous steps, used separately as feedstock for secondary processes, or discarded.

In various embodiments, the decanter 32 also has the capability to dewater the liquid. Dewatering involves separating water and other aqueous waste from the latex to the waste water recovery area 54, in order to effectively concentrate the latex rubber emulsion. In such an embodiment, a stream of concentrated latex emulsion exits the decanter 32, and is transferred to a storage vessel (not shown) for holding, or sent directly to a first separator 34.

As shown in FIG. 1B (one example of which is disclosed in Example 3), following the decanter 32 step, the latex-containing homogenate liquid is fed to a series of separators, including the first separator 34, a first latex concentrator 36, and a second latex concentrator 38. Steps 34-38 are optionally performed to further remove fine solids from the emulsion and concentrate the latex rubber emulsion, by removing water and other aqueous waste to the waste water recovery area 54. Finer-sized solid particles that were not removed by the decanter 32 are removed by the first separator 34. The first separator 34 step prevents clogging in the first latex concentrator 46 and second latex concentrator 38.

The first separator 34 may consist of any physical or mechanical phase separating system used to separate a light phase containing latex and a heavy phase containing waste products. Depending on desired quality and production requirements, following the first separator 34 step, the resulting light phase containing latex may be further concentrated in one or more concentrator steps. For example, light phase containing latex is further concentrated in a first latex concentrator 36, and second latex concentrator 38, such as an Alfa Laval Latex 2000 high speed centrifuge.

However, it is understood, in one embodiment, that a single latex concentrator is used, while in other embodiments, multiple latex concentrators are used for multiple concentration steps. It is also understood that multiple latex concentration steps may be performed in a single latex concentrator. In other embodiment, two latex concentrators are used to perform three or more latex concentration steps. For example, second and third concentrations are performed using second latex concentrator 38, as illustrated in Example 4.

In the first latex concentrator 36 and/or the second latex concentrator 38 the light phase may be mixed with additional chemical solution, as disclosed more specifically in Example 3. In various embodiments, light phase containing latex may be stored in one or more intermediate tanks (not shown in FIG. 1A or 1B) between the first separator 34 step, first latex concentrator 36 step and/or second latex concentrator 38 step. In various embodiments, either or both the first latex concentrator 36 and/or the second latex concentrator 38 have a discharge feature, to release built-up solids in order to prevent clogging.

The first latex concentrator 36 comprises any physical or mechanical phase separating system used to remove water and concentrate the latex emulsion, such as by high speed centrifugation. In one embodiment, the first latex concentrator 36 is a customized high speed centrifuge specifically made for latex concentration, such as high speed centrifuge latex concentrators by Alfa Laval and Westphalia. Chemical solutions may be added during this step to improve latex quality. For example, in the first latex concentrator 36, the latex rubber emulsion may be diluted with a chemical solution to aid in removing soluble proteins and other impurities and to remove additional water, and then concentrated by centrifugal separation.

As shown in FIG. 1B, the waste water and impurities from the first latex concentrator 36 are transferred to the waste water recovery and reuse area 54. After leaving the first latex concentrator 36 the concentrated latex rubber is then optionally transferred to storage (not shown) and analyzed for concentration and product quality. If the product is concentrated enough, and the soluble proteins and other impurities are been adequately removed, after the first latex concentrator 36 based on latex assays as shown in Example 7, it will be transferred to final product storage system 50 for shipment to customers. Where additional concentration and/or purification is required, the product will be sent to the second latex concentrator 38.

As with the first latex concentrator 36, the second latex concentrator 38 also comprises any physical or mechanical phase separating system used to remove water and concentrate the latex emulsion, such as by high speed centrifugation. In one embodiment, the second latex concentrator 38 is also a customized high speed centrifuge specifically made for latex concentration, such as high speed centrifuge latex concentrators by Alfa Laval and Westphalia. Chemical solutions may be added during this step to improve latex quality. For example, in the second latex concentrator 38, the latex rubber emulsion may be diluted with a chemical solution to aid in removing soluble proteins and other impurities and to remove additional water, and then concentrated by centrifugal separation. As shown in FIG. 1B, the waste water and impurities from the second latex concentrator 38 are also transferred to the waste water recovery and reuse area 54. Emulsion yield is measured using the standard Mg/ml latex total solids content, dried gravimetrically, and weighed, as disclosed in further detail in Example 3.

After leaving the second latex concentrator 38 the concentrated latex rubber is then transferred to storage (not shown) and analyzed for concentration and product quality. If the product is concentrated enough, and the soluble proteins and other impurities have been adequately removed, after the second high speed latex concentrator it will be transferred to final product storage for shipment to customers in various packages. Following latex concentration, the resulting latex product is ready for processing use where it has a pH range of about pH 8.0 to pH 11.0 and a dry rubber content ("DRC") of more than 40%, based on standard assay techniques, for example, as disclosed in Example 3.

For general processing uses, such as the production of gloves, the DRC of latex product is considered acceptable when the weight-to-volume ratio is equal to or greater then 40%. For example, a 100 ml aliquot of liquid latex resulting in 40g of dry rubber when dried would have a DRC of 40%. If the latex emulsion requires additional concentration, the material will be further concentrated using centrifugation, or transferred as feed for the creaming steps 40-46 of the process.

The creaming system comprises creaming steps 40-46, as shown in FIG. 1B, one embodiment of which is further disclosed in Example 5. The creaming system serves a similar function to concentration system disclosed in steps 34-38. Both systems are additional concentration steps which increase the concentration of latex without affecting the concentration of soluble components in the aqueous phase of the latex. Both systems increase the volume of latex while decreasing aqueous volume, and both systems require several dilutions which wash away solutes, and re-concentrate latex. However, efficient separations with centrifuges become impractical after the soluble components and colloidal stabilizers decrease below certain levels. At a certain level, the latex is so "clean" that it coagulates under centrifugal force, making the addition of powerful surfactants or non-shear force concentration necessary.

The creaming process allows additional washes and re-concentration using normal gravity, if necessary after centrifugation becomes impractical. In one example of the system the creaming steps 40-46, are performed in a series of 1600 gallon, vertical, straight walled, cone-bottom, cylindrical stainless steel vessels. In other embodiments, other types of vessels may be used.

As shown in FIG. 1B, the creaming solution mix system 40 is comprised of equipment to prepare batches of solution to be added to the cream mixing tank 42, followed by a first cream settling system 44, and an optional second cream settling system 46. Additional optional cream settling systems and cream mixing tank 42 steps (not shown in FIG. 1B) may be optionally performed depending on desired results. Following the final settling system, the remaining latex supernatant layer is transferred to a latex product tank area 48, where testing is performed on the final product to determine pH range and dry rubber content.

The solution in the cream solution mix system 40 is comprised of a coagulant, several stabilizers, and an antioxidant. The cream solution mix system 40 allows the latex rubber emulsion to phase separate with the water until it reaches the desired concentration (e.g., 50-60 wt % latex rubber concentration in water), and also removes undesirable proteins and impurities. The contents of the cream solution mix system 40 are pumped to the cream mixing tank via various methods, for example, by batch transfer.

The cream mixing tank 42 is a vessel for further concentration of latex. In one embodiment, the cream mixing tank 42 is an agitated vessel with heating and cooling to control the temperature. In one embodiment, the temperature is held between 20-30° C. According to other embodiments, creaming will occur at temperatures outside of this range or without temperature controls.

In one embodiment, the contents of the cream solution mix system 40 and the product of the second latex concentrator 38 step are combined in the cream mixing tank 42. In this embodiment, the combined contents of the cream mixing tank 42 are then agitated for thorough mixing, and the temperature is adjusted into the 20-30° C. range.

As shown in FIG. 1B, following agitation in the cream mixing tank 42, the contents are then transferred to a first cream settling system 44. In one embodiment, first cream settling system 44 comprises one or more insulated non-agitated tanks insulated to maintain a 20-30° C. internal content temperature. In other embodiments, first cream settling system 44 occurs at temperatures outside of this range, or without temperature controls.

The duration of the first cream settling system 44 is dependent on the volume of the tanks, and other environmental factors. The first cream settling system 44 is complete after the bottom water phase (typically brown in color) separates from the top latex rubber phase (typically greenish in color). The aqueous layer is decanted to the waste water recovery and reuse area 54. The upper layer containing a latex rubber phase is transferred back to the cream mix tank 42 where the latex rubber phase is again mixed with additional cream solution mix system 40 comprised of a coagulant, several stabilizers, and an antioxidant.

As shown in FIG. 1B, following the second agitation period in the cream mixing tank 42, the contents are then transferred to the second cream settling system 46, which also comprises one or more insulated non-agitated tanks insulated to maintain a 20-30° C. internal content temperature. In one embodiment, the second cream settling system 36 comprises one or more insulated non-agitated tanks insulated to maintain a 20-30° C. internal content temperature. In other embodiments, the second cream settling system 46 occurs at temperatures outside of this range, or without temperature controls.

The duration of the second cream settling system 46 is also dependent on the volume of the tanks and other environmental factors. Again, the second cream settling system 46 separates the latex rubber emulsion from the water and removes undesirable proteins and impurities. As above, the aqueous layer is decanted to the waste water recovery and reuse area 54. The upper layer containing a latex rubber phase is transferred to the latex product tank area 48, for testing and then ultimately transferred to the final product storage system 50.

The physical properties and composition of the latex product may be monitored at one or more stages in the process, as disclosed above (e.g., after the second press 30, after the decanter 32 step, after the first separator step 34, after concentration, after creaming, or at other stages in the process). One method of testing is shown in Example 7.

Generally, any extracted latex for industrial or medical uses, including that of the present disclosure, is tested for conformity with the standard specifications of American Society for Testing and Materials ("ASTM") for Standard D1076-02, as shown in Table 1 below. Specifically, Table 1 shows the D1076-02 Standard Specification for Rubber-Concentrated, Ammonia Preserved, Creamed, and Centrifuged Natural Latex. In one embodiment, the extracted latex conforms with D1076-02 Type 1. In another embodiment, the latex conforms with D1076-02 Type 3.

TABLE 1

| Type | Description |
| --- | --- |
| Type 1 | Centrifuged natural latex preserved with ammonia only or by formaldehyde followed by ammonia |
| Type 2 | Creamed natural latex preserved with ammonia only or by formaldehyde followed by ammonia |
| Type 3 | Centrifuged natural latex preserved with low ammonia with other necessary preservatives |

In other embodiments the extracted latex conforms to specifications included in ASTM's standard values for natural rubber latex, including total solids, dry rubber content, alkalinity, viscosity, sludge content, coagulum content, KOH number, pH, stability, copper and manganese levels, density, volatile fatty acids, and the like as shown in Table 2 below. In other embodiments, the specific properties and characteristics of the extracted latex differ from those listed in the specifications of ASTM D1076-02. For example, this may be due to the inherent property differences between *Hevea*-derived latex source, toward which the standard values are directed, to values of a non-*Hevea*-derived latex source.

TABLE 2

| | Properties | | | |
| --- | --- | --- | --- | --- |
| | KOH-Buffered Latex Product | KOH-Buffered Latex Product Final Processing Step | Ammoniated Latex Product | Ammoniated Latex Product |
| | Centrifuged | Centrifuged and Creamed | Centrifuged | Centrifuged and Creamed |
| Total Solids Content (%) | 48.0 | 54.0 | 48.0 | 54.0 |
| Dry Rubber Content (%) | 47.0 | 53.0 | 47.0 | 53.0 |

TABLE 2-continued

| | Properties | | | |
|---|---|---|---|---|
| | KOH-Buffered Latex Product | KOH-Buffered Latex Product Final Processing Step | Ammoniated Latex Product | Ammoniated Latex Product |
| | Centrifuged | Centrifuged and Creamed | Centrifuged | Centrifuged and Creamed |
| Total Alkalinity, KOH as % Latex | 0.10 | 0.40 | 0.10 | 0.40 |
| Viscosity @ 43% TSC, cps | 20.0 | 150.0 | 20.0 | 150.0 |
| Sludge, weight % | — | 0.07 | — | 0.07 |
| Coagulum, weight % | — | 0.02 | — | 0.02 |
| pH | 11.0 | 13.0 | 11.0 | 13.0 |
| Mechanical Stability @ 43% TSC, seconds | 100.0 | 600.0 | 100.0 | 600.0 |
| Copper (ppm) | — | 6.0 | — | 6.0 |
| Manganese (ppm) | — | 6.0 | — | 6.0 |
| Density (Mg/m3) | 0.940 | 0.960 | 0.940 | 0.960 |
| Color | Off-white, beige | Off-white, beige | Off-white, beige | Off-white, beige |
| Odor | No Odor | No Odor | Mild smell of ammonia | Mild smell of ammonia |

The purity of the final latex product is tested by determining the concentration of the protein in the aqueous phase of the latex, through standard techniques such as the ASTM D5712 latex protein analysis and ASTM 6499 *Hevea* antigenic protein analysis. Overall purity or composition requirements are dependent on the use of the final latex product; however, generally, a benchmark standard for the final product includes general conformation to the ASTM D1076-02 standards or a dry rubber content percentage above 40 wt % latex rubber concentration in water.

ASTM specification grade latex may be stored in the final product storage system 50 in agitated tanks at 4° C. for an indefinite period of time. Stabilizers or other agents may be added depending upon downstream product performance requirements. Latex may be packaged in individual shipping containers, or transported in bulk in refrigerated trucks, tankers, barges, railcars, and the like. Typical applications of the method disclosed herein include surgical or examination gloves, medical adhesive, latex wound care products, catheters, or other medical equipment or devices where a clinically proven solution to the serious health risks posed by tropical rubber latex is required.

EXAMPLE 1

Ammonia Antioxidant Chemical Solution System & Milling

A water-based ammonia antioxidant ("AAO") solution, containing 695 mL/L ammonium hydroxide ($NH_4OH$) and the anti-microbial bleaching agent 1 g/L sodium sulfite ($Na_2SO_3$) is mixed with water by injection. AAO is stored at a pH of 10.5 in 50 gallon tanks, or is alternately processed through the system without storage, at a pH of 10.0. The AAO is pumped into the milling system 22 through the use of solenoids, and combined with guayule plant materials in a wet mill. Plant materials are emulsified to form a slurry. The milling system 22 comprises a wet mill, and more specifically a Schutte-Buffalo Pulverizer Co. (Buffalo, N.Y.) MP-30 grinder, which accepts plant material, conveyed to a hopper of the MP-30, and cuts the plants into relatively uniform pieces of 3-6 inches. The milling system 22 further comprises a belt conveyer, which transferred the ground guayule pieces to a Schutte-Buffalo 1320 hammer mill for hammer-milling.

EXAMPLE 2

Milling System and Pressing Steps

Following the milling system 22 steps, disclosed in Example 1, guayule plant materials are pressed in a first press 26 step, comprising a screw auger and a Brown International screw press, which presses the liquid slurry through a screen to separate the liquid phase the AAO/dilute latex homogenate from the solid phase. The solid phase bagasse does not pass through the screen. The liquid AAO/dilute latex homogenate slurry is collected in a recirculation tank, and the bagasse drops directly into a Compak Systems, CS Processing Engineering Ltd. (Lincoln, England) paddle washer.

Any remaining particles of latex are washed from the bagasse in the Compak Systems paddle washer by a pressurized stream of water from a water tank. More specifically, the water tank used in the washing step 28 has a booster pump attached to a high pressure solenoid source, which interfaces water with the homogenate material, and pumps the AAO/latex homogenate to the Compak Systems paddle washer.

Following the washing step 28, guayule plant materials are then pressed in a second press 30 step, comprising passing the AAO/dilute latex homogenate slurry into another screw press, where the liquid is again separated from any remaining solids. Resulting AAO/dilute latex homogenate is pumped into a recirculation tank, while the bagasse drops into a ComPak International screw auger.

Finally, the liquid AAO/dilute latex homogenate in the recirculation tank is pumped into an Alfa Laval (Sweden) decanter 32, where latex homogenate from the first press 26 step and second press 30 steps are mixed together before further processing. Bagasse from the first press 26 step and second press 30 step are also combined in the biomass collection and reuse area 52, and are further processed for other secondary uses. Polymeric flocculating agents, stabilizers, and anti-foaming agents are added to the liquid AAO/dilute latex homogenate in the decanter 32, for increased stability and decreased foaming.

EXAMPLE 3

Separation and Concentration

After the pressing and decanting steps, as disclosed in Example 2, the latex homogenate is measured to determine the percentage of latex present (desirably about 0.01% to 1% after decanting) and transferred from the decanter 32 to the first separator 34, an Alfa Laval PX-510 high speed centrifuge, and centrifuged for about 15 seconds or less.

The first separator 34 separates the latex homogenate into a light phase containing latex, and a heavy phase containing waste products. The heavy phase is removed to the waste water recovery area 54, where waste products are recycled for use as a grinding medium or for further cleaning using standard water purification treatments. Following the first separator 34, the latex homogenate is measured to determine the percentage of latex present. Preferably this is about 1% after the first separator 34 step.

After being separated in the first separator 34, the light phase containing latex is pumped into an intermediate tank (not shown in FIG. 1B), and is mixed with AAO, via an AAO tank (not shown in FIG. 1B), flowing directly into the intermediate tank. The light phase is then pumped into the first latex concentrator 36, a high speed Alfa Laval Latex 2000 optimized for guayule latex, in order to further concentrate the latex. Excess amounts of the light phase containing latex that passed though the system are re-run, by pumping the light phase to another intermediate tank, where it is mixed with additional AAO, via an AAO tank flowing directly into the intermediate tank (not shown in FIG. 1B). The latex homogenate is then tested to determine the percentage of latex present, desirably about 10% or more at this point.

The homogenate is then run through the second latex concentrator 38, a high speed Alfa Laval Latex 2000 optimized for guayule latex. Following this second latex concentrator 38 step, pH is tested and determined. Typical results for the second latex concentrator 38 step are a latex product with a final pH of about 10.5. The dry rubber content is then determined gravimetrically, wherein a known-volume aliquot of liquid latex is dried to remove substantially all of the moisture content and weighed, and a determination is made as to whether the material requires further processing with the creaming system, as disclosed below. Following second latex concentrator 38 step the percentage of latex present is desirably about 40% to 50% or more.

EXAMPLE 4

Three Pass Concentration

In some embodiments of the present disclosure, more than two concentrations, also called "passes" through a latex concentrator, are performed. In one embodiment, a third concentration is performed. In one example, this third concentration, also referred to herein as the "third pass" is done with second latex concentrator 38, a high speed Alfa Laval Latex 2000 optimised for guayule latex. In this example, the latex is collected and an additional 16:1 dilution of AAO and surfactant is added to the light phase from the second concentration (or second pass) in one tank, and a 32:1 in another, which was previously diluted at 5:1.

In this example the latex subnatant from the third pass was much more translucent in color than the second pass. The light phase of the third pass resulted in about 55% total solid content. According to this example, maintaining a 16:1 dilution of latex is preferable in conducting a third pass.

EXAMPLE 5

Creaming

Following the steps disclosed in Example 3, testing may indicate that the product requires additional concentration. Latex containing light phase is pumped into a 105-gallon cream mixing tank 42, and mixed with a cream solution mix, containing 0.1% sodium alginate from the cream solution mix system 40. Following this mixing step, the contents are transferred to the first cream settling system 44, and settling is allowed in an insulated non-agitated tank insulated to maintain a 20-30° C. internal content temperature. Following settling, the subnatant aqueous waste layer is drained to the wastewater recovery and reuse area 54. The remaining latex supernatant layer is transferred back to the cream mixing tank 42, where the cream mixing tank 42, is refilled with 0.1% sodium alginate solution and mixed. Following this mixing step, the contents are transferred to the second cream settling system 46, and settling is allowed in a non-agitated tank insulated to maintain a 20-30° C. internal content temperature. Following settling, the subnatant aqueous waste layer is again drained to the wastewater recovery and reuse area 54. These steps are repeated to wash the soluble proteins from the latex, as many times as required. Where the cream mixing tank 42, was refilled six times to further concentrate the latex, and remove subnatants, a latex product with a final pH of about 10.5 resulted.

In various embodiments, the processes disclosed herein are monitored by a control system (not shown in FIG. 1A or 1B), one example of which is disclosed in Example 6. In various embodiments, this control system will regulate and/or monitor temperature, process conditions, volume, water or chemical input and output, product output, and/or waste collection, through a series of pumps, computers, and flow meters, as required by the specific system.

EXAMPLE 6

Control System

One example of the control system for the process disclosed herein is by a Motor Control Center ("MCC") tied to a Programmed Logic Center ("PLC"). The PLC controls the start and stop of the machinery, although the machines are able to be controlled manually as well. Multiple Yokogawa (Japan) pH meters are tied to the PLC. Locations for pH meters include solution tanks, collection tanks, and at the recirculation tank for the paddle washer.

Ammonium hydroxide is pumped directly to the locations of the pH meters, using a metering pump. An ammonium hydroxide flow is controlled with the use of solenoids tied to the PLC. Lines connecting ammonium hydroxide tanks are also connected with the final intermediate tank before creaming, in order to control final pH, and this line is controlled either manually or automatically by the PLC.

Six flow meters are present within the system. These included two Omega (Stamford, Conn.) FTB792 turbine flow meters to monitor and adjust flow. The Omega FTB792 turbine flow meters are placed at the solenoid-ammonium hydroxide/R/O water line attachment, and the sodium sulfite/R/O water line attachment. At the point of attachment, ammonium hydroxide and sodium sulfite are mixed with water for injection.

One additional turbine Omega FPR 132 flow meter regulates the water output for the mix and provides precise information on the quantity of liquid present in the system throughout the process. In addition, the system also contains three additional flow meters, more specifically, Endress Hauser (Switzerland) PROline Promag 50/53p magmeters to monitor the homogenate.

The system further contains multiple pumps, including multiple variable-speed input pumps, tied to the PLC, and all single speed output pumps. Additionally, the water system throughout the process has a high water flow that utilizes Advanced Water Systems (Santa Cruz, Calif.) R/O high pressure system, with a flow of approximately 12-14 gallons/minute. Water is softened as necessary with sulfuric acid, in order to maintain optimal water flow.

EXAMPLE 7

Assay Standards

Following the steps disclosed in Examples 1-4, ASTM latex protein analysis is performed according to the ASTM D5712 protocol, and compared with ASTM D1076-02 standards. The guayule-derived latex compound is measured to determine final composition of each ASTM parameter. As shown in FIG. 1B, the purity of the final latex product is tested by determining the concentration of the protein in the aqueous phase of the latex in various batches, indicated approximately 48-54% total rubber content, approximately 47-53% dry rubber content, and total alkalinity (KOH as % latex) of approximately 0.10 to 0.40%. The guayule-derived latex product meets or exceeds ASTM standards, and is ready for packaging, storage, or further secondary manufacturing into derivative products.

It is further envisioned that the process disclosed herein may be modified to include additional steps such as flocculating processes, a variety of pumping systems such as positive displacement pumps, a variety of grinders, centrifuges, vibrating screen technology, screw presses, vacuum pumps, diesel separation systems, modifications of the chemical creaming formulations, and the like. Likewise, a number of steps disclosed in the process may be omitted or re-ordered based on desired product and individual characteristics of plant materials.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of a preferred embodiment and best mode of the invention known to the applicant at this time of filing the application has been presented and is intended for the purposes of illustration and description. It is not intended to be exhaustive nor limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out the invention.

What is claimed:

1. A method for commercial-scale extraction of a biopolymer from a non-*Hevea* plant material, comprising:
    separating small leaves, flower parts and small stems from a non-*Hevea* plant material, wherein the plant material is guayule, using a, high capacity air density separator, wherein the small leaves, flower parts and small stems are sent to a biomass collection and reuse area;
    debarking the plant material, wherein the de-barking system increases the percentage of biopolymer extracted, wherein the woody pulp derived from the de-barking system is sent to the biomass collection and reuse area;
    grinding of the plant material;
    milling of the plant material in a chemical solution system, the chemical solution comprising a water-based solution to emulsify the plant material to form a slurry, a buffer, an anti-microbial agent, a bleaching agent, a de-foaming agent and an antioxidant, wherein the chemical solution is maintained at a pH between 7.1 and 12.5, whereby the milling results in a milled product comprised of a solid bagasse and a liquid homogenate, wherein the liquid homogenate includes milled plant material, a buffer and water;
    filtering out the solid bagasse from the liquid homogenate;
    separating the liquid homogenate into a light phase and a heavy phase using a commercial centrifuge;
    purifying the light phase, wherein soluble proteins are removed; and
    concentrating the light phase, wherein the concentration of the light phase produces a usable biopolymer.

2. The method of claim 1, further comprising chopping the plant material into pieces prior to grinding the plant material.

3. The method of claim 1, wherein the buffer is selected from the group consisting of: ammonium hydroxide, potassium hydroxide, sodium hydroxide, and sodium bicarbonate.

4. The method of claim 1, wherein the antioxidant is selected from the group consisting of: sodium sulfite, butylated hydroxytoluene, butylated hydroxyanisole, ascorbate, propyl gallate, alkylated diphenylamine, polybutylated bisphenol A, alkylated para-phenylenediamine, styrenated phenol, and hindered bisphenol.

5. The method of claim 1, further comprising washing the bagasse, whereby additional biopolymer particles are removed from the bagasse.

6. The method of claim 1, wherein filtering the bagasse includes using a screen to separate the liquid homogenate from the bagasse.

7. The method of claim 1, further comprising using the bagasse in a secondary manufacturing process.

8. The method of claim 7, wherein the secondary manufacturing process is selected from a group consisting of: resin extraction, ligin extraction, cellulose processing and hemicellulose processing.

9. The method of claim 7, wherein the secondary manufacturing process produces a product selected from the group consisting of: resin, ligin, adhesive, pesticide, an anti-fungal agent, ethanol, particle board, insulation, mulch, organic soil amendment, fuel pellets, fireplace logs, ceiling tiles, building material, playground equipment, and flooring.

10. The method of claim 1, further comprising decanting the liquid homogenate, wherein additional solid bagasse is removed.

11. The method of claim 10, wherein decanting includes centrifugation.

12. The method of claim 1, further. comprising removing water from the liquid homogenate.

13. The method of claim 1, further comprising removing the heavy phase to a waste water recovery area.

14. The method of claim 1, wherein purifying the light phase includes mixing it with ammonia and an antioxidant.

15. The method of claim 1, wherein the usable biopolymer is rubber latex.

16. The method of claim 15, wherein the latex conforms to specifications of the American Society for Testing and Materials for a standard selected from the group consisting of: D1076-02 Standard Specification for Rubber-Concentrated, Ammonia Preserved, Creamed, and Centrifuged Natural Latex Type 1; and D1076-02 Standard Specification for Rubber-Concentrated, Ammonia Preserved, Creamed, and Centrifuged Natural Latex Type 3.

17. The method of claim 1, wherein the plant material includes more than one percent of the biopolymer.

18. The method of claim 1, further comprising storing the biopolymer.

19. A method for commercial-scale extraction of a biopolymer from a non-*Hevea* plant material, comprising:
   separating small leaves, flower parts and small stems from a non-*Hevea* plant material using a, high capacity air density separator, wherein the small leaves, flower parts and small stems are sent to a biomass collection and reuse area;
   debarking the plant material, wherein the de-barking system increases the percentage of biopolymer extracted, wherein the woody pulp derived from the de-barking system is sent to the biomass collection and reuse area;
   grinding of the plant material;
   milling of the plant material in a chemical solution system, the chemical solution comprising a water-based solution to emulsify the plant material to form a slurry, a buffer, an anti-microbial agent, a bleaching agent, a de-foaming agent and an antioxidant, wherein the chemical solution is maintained at a pH between 7.1 and 2.5, whereby the milling results in a milled product comprised of a solid bagasse and a liquid homogenate, wherein the liquid homogenate includes milled plant material, a buffer and water;
   filtering out the solid bagasse from the liquid homogenate;
   separating the liquid homogenate into a light phase and a heavy phase using a commercial centrifuge;
   purifying the light phase, wherein soluble proteins are removed; and
   concentrating the light phase, wherein the concentration of the light phase produces a usable biopolymer, wherein the biopolymer is rubber latex, and wherein the rubber latex conforms to specifications of the American Society for Testing and Materials for a standard selected from the group consisting Of: D1076-02 Standard Specification for Rubber-Concentrated, Ammonia Preserved, Creamed, and Centrifuged Natural Latex Type 1; and D1076-02 Standard Specification for Rubber-Concentrated, Ammonia Preserved, Creamed, and Centrifuged Natural Latex Type 3.

20. The method of claim 19, further comprising chopping the plant material into pieces prior to grinding the plant material.

21. The method of claim 19, wherein the buffer is selected from the group consisting of: ammonium hydroxide, potassium hydroxide, sodium hydroxide, and sodium bicarbonate.

22. The method of claim 19, wherein the antioxidant is selected from the group consisting of sodium sulfite, butylated hydroxytoluene, butylated hydroxyanisole, ascorbate, propyl gallate, alkylated diphenylamine, polybutylated bisphenol A, alkylated para-phenylenediamine, styrenated phenol, and hindered bisphenol.

23. The method of claim 19, further comprising washing the bagasse, whereby additional biopolymer particles are removed from the bagasse.

24. The method of claim 19, wherein filtering the bagasse includes using a screen to separate the liquid homogenate from the bagasse.

25. The method of claim 19, further comprising using the bagasse in a secondary manufacturing process.

26. The method of claim 25, wherein the secondary manufacturing process is selected from a group consisting of: resin extraction, ligin extraction, cellulose processing and hemicellulose processing.

27. The method of claim 25, wherein the secondary manufacturing process produces a product selected from the group consisting of: resin, ligin, adhesive, pesticide, an anti-fungal agent, ethanol, particle board, insulation, mulch, organic soil amendment, fuel pellets, fireplace logs, ceiling tiles, building material, playground equipment, and flooring.

28. The method of claim 19, further comprising decanting the liquid homogenate, wherein additional solid bagasse is removed.

29. The method of claim 28, wherein decanting includes centrifugation.

30. The method of claim 19, further comprising removing water from the liquid homogenate.

31. The method of claim 19, further comprising removing the heavy phase to a waste water recovery area.

32. The method of claim 19, wherein purifying the light phase includes mixing it with ammonia and an antioxidant.

33. The method of claim 19, wherein the plant material includes more than one percent of the biopolymer.

34. The method of claim 19, further comprising storing the biopolymer.

35. A method for commercial-scale extraction of a biopolymer from a non-*Hevea* plant material, comprising:
   separating small leaves, flower parts and small stems from a non-*Hevea* plant material using a, high capacity air density separator, wherein the small leaves, flower parts and small stems are sent to a biomass collection and reuse area;
   debarking the plant material, wherein the de-barking system increases the percentage of biopolymer extracted, wherein the woody pulp derived from the de-barking system is sent to the biomass collection and reuse area;
   chopping the plant material;
   grinding of the plant material;
   milling of the plant material in a chemical solution system, the chemical solution comprising a water-based solution to emulsify the plant material to form a slurry, a buffer, an anti-microbial agent, a bleaching agent, a de-foaming agent and an antioxidant, wherein the chemical solution is maintained at a pH between 7.1 and 12.5, whereby the milling results in a milled product comprised of a solid bagasse and a liquid homogenate, wherein the liquid homogenate includes milled plant material, a buffer and water;
   filtering out the solid bagasse from the liquid homogenate;
   separating the liquid homogenate into a light phase and a heavy phase using a commercial centrifuge;
   purifying the light phase, wherein soluble proteins are removed; and
   concentrating the light phase, wherein the concentration of the light phase produces a usable biopolymer.

36. The method of claim 35, wherein the buffer is selected from the group consisting of: ammonium hydroxide, potassium hydroxide, sodium hydroxide, and sodium bicarbonate.

37. The method of claim 35, wherein the antioxidant is selected from the group consisting of sodium sulfite, butylated hydroxytoluene, butylated hydroxyanisole, ascorbate, propyl gallate, alkylated diphenylamine, polybutylated bisphenol A, alkylated para-phenylenediamine, styrenated phenol, and hindered bisphenol.

38. The method of claim 35, further comprising washing the bagasse, whereby additional biopolymer particles are removed from the bagasse.

39. The method of claim 35, wherein purifying the light phase includes mixing it with ammonia and an antioxidant.

40. The method of claim 35, wherein the usable biopolymer is rubber latex.

41. A method for commercial-scale extraction of rubber latex from guayule plant material, comprising:
  separating small leaves, flower parts and small stems from a non-*Hevea* plant material using a high capacity air density separator, wherein the small leaves, flower parts and small stems are sent to a biomass collection and reuse area:
  debarking the plant material, wherein the de-barking system increases the percentage of biopolymer extracted, wherein the woody pulp derived from the de-barking system is sent to the biomass collection and reuse area;
  grinding the guayule plant material, wherein the plant material was previously chopped into relatively uniform pieces of three to six inches;
  milling the guayule with a chemical solution system, the chemical solution comprising a water-based solution to emulsify the plant material to form a slurry, a buffer, an anti-microbial agent, a bleaching agent, a de-foaming agent and an antioxidant, wherein the chemical solution is maintained at a pH between 7.1 and 12.5, whereby the milling results in a milled product comprised of a bagasse and a liquid homogenate, wherein the liquid homogenate includes milled guayule, the buffer and water;
  filtering out the bagasse from the milled product;
  separating the liquid homogenate into a light phase and a heavy phase using a commercial centrifuge;
  purifying the light phase, wherein soluble proteins are removed; and
  concentrating the light phase; wherein the concentration of the light phase produces a usable biopolymer, wherein the biopolymer is rubber latex, and wherein the rubber latex conforms to specifications of the American Society for Testing and Materials for a standard selected from the group consisting of: D1076-02 Standard Specification for Rubber-Concentrated, Ammonia Preserved, Creamed, and Centrifuged Natural Latex Type 1; and D1076-02 Standard Specification for Rubber-Concentrated, Ammonia Preserved, Creamed, and Centrifuged Natural Latex Type 3.

42. The method of claim 41, further comprising decanting the liquid homogenate, wherein additional solid bagasse is removed.

* * * * *